United States Patent
Ono et al.

(10) Patent No.: US 11,300,455 B2
(45) Date of Patent: Apr. 12, 2022

(54) OPTICAL SPECTRAL LINE WIDTH CALCULATION METHOD, DEVICE, AND PROGRAM

(71) Applicant: Nippon Telegraph and Telephone Corporation, Tokyo (JP)

(72) Inventors: Shingo Ono, Musashino (JP); Kunihiro Toge, Musashino (JP); Tetsuya Manabe, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 0 days.

(21) Appl. No.: 16/982,678

(22) PCT Filed: Mar. 26, 2019

(86) PCT No.: PCT/JP2019/012720
§ 371 (c)(1),
(2) Date: Sep. 21, 2020

(87) PCT Pub. No.: WO2019/198485
PCT Pub. Date: Oct. 17, 2019

(65) Prior Publication Data
US 2021/0018372 A1   Jan. 21, 2021

(30) Foreign Application Priority Data
Apr. 9, 2018 (JP) .............................. JP2018-075087

(51) Int. Cl.
*G01J 9/04* (2006.01)
*G01J 9/02* (2006.01)
(52) U.S. Cl.
CPC .. *G01J 9/04* (2013.01); *G01J 9/02* (2013.01)
(58) Field of Classification Search
CPC ...................................... G01J 9/02; G01J 9/04
See application file for complete search history.

(56) References Cited

U.S. PATENT DOCUMENTS

| 4,899,360 A * | 2/1990 | Fujita .................... H01S 5/1021 372/50.1 |
| 2018/0195905 A1* | 7/2018 | Poole ................ H04B 10/07957 |
| 2018/0269659 A1* | 9/2018 | Ishii .................... H01S 5/06258 |

FOREIGN PATENT DOCUMENTS

| JP | 63157023 A  * 6/1988 |
| JP | 02247531 A  * 10/1990 |

(Continued)

OTHER PUBLICATIONS

Kim, Jae Wan et al. "Measurement of the linewidth of a continuous-wave laser with a cavity-length modulation technique". Applied Optics, vol. 38, No. 9, Mar. 20, 1999, pp. 1742-1745. (Year: 1999).*

(Continued)

*Primary Examiner* — Michael A Lyons
(74) *Attorney, Agent, or Firm* — Workman Nydegger

(57) ABSTRACT

Provided is an optical spectrum line width calculation method, apparatus, and program capable of calculating a spectrum line width of a laser to be measured from an optical interference signal generated by an optical interferometer having a delay line, based on a phase of the optical interference signal having a delay time longer than a delay time due to the delay line. The optical spectrum line width measurement apparatus includes a Mach-Zehnder interferometer, an optical receiver that receives an optical interference signal emitted from the Mach-Zehnder interferometer, an A/D converter that converts an analog electric signal output from the optical receiver into a digital electric signal, and a processing apparatus that processes the digital electric signal. Two light beams having a delay difference τ are generated from light emitted from the laser to be measured, and an optical interference signal is generated by multiplexing the two light beams.

16 Claims, 8 Drawing Sheets

(56) References Cited

FOREIGN PATENT DOCUMENTS

| JP | 03257336 A | * | 11/1991 |
| JP | 06094541 A | * | 4/1994 |
| JP | 2011242345 A | * | 12/2011 |

OTHER PUBLICATIONS

International Search Report and Written Opinion dated Jul. 2, 2019, filed in PCT Application No. PCT/JP2019/012720, filed Mar. 26, 2019.
T. Okoshi et al., Novel Method for High Resolution Measurement of Laser Output Spectrum, Electronics Letters, vol. 16, No. 16, Jul. 31, 1980, pp. 630-631.

* cited by examiner

OPTICAL SPECTRAL LINE WIDTH CALCULATION METHOD, DEVICE, AND PROGRAM

TECHNICAL FIELD

The present disclosure relates to an optical spectrum line width calculation method, apparatus, and program using a self-delay heterodyne/homodyne method.

BACKGROUND ART

In coherent optical communication or optical frequency domain reflection measurement, the coherence of a laser is an important element that affects performance Narrow line width (high coherence) lasers are being developed to improve the performance of these applied technologies, and a highly accurate optical spectrum line width measurement method is required for accurate laser performance evaluation.

A technology widely used for the line width measurement is a self-delay heterodyne/homodyne method (for example, Non-Patent Literature 1). FIG. 1 is a diagram illustrating a configuration example of a general optical spectrum line width measurement apparatus using the self-delay heterodyne/homodyne method. The optical spectrum line width measurement apparatus 100 includes a Mach-Zehnder interferometer 110, an optical receiver 120 for receiving an optical interference signal emitted from the Mach-Zehnder interferometer 110, and an RF spectrum analyzer 130 for processing a signal output from the optical receiver 120. In the Mach-Zehnder interferometer 110, an optical delay fiber 111 is provided on one arm waveguide, and an optical frequency shifter 112 is provided on the other arm waveguide.

In the present measurement method, two light beams having a delay difference $\tau$ are generated from light emitted from a laser to be measured 200 using the Mach-Zehnder interferometer 110, and an optical spectrum line width $\sigma$ is obtained from a power spectrum shape of an optical interference signal obtained by multiplexing the two light beams. In the heterodyne method, one of the light beams having the delay difference $\tau$ is given any optical frequency shift $f_b$ to cause interference, and a spectrum of an optical interference signal having $f_b$ as a center frequency is obtained. In contrast to this, in the homodyne method, the optical frequency shifter 112 is omitted, and the light having the delay difference $\tau$ is caused to interfere at the same frequency without giving the optical frequency shift, a spectrum of an optical interference signal having 0 Hz as a center frequency is obtained.

A power spectrum $S(f)$ of the optical interference signal can be described as the following formula.

Formula 1

$$S(f) \propto \frac{\tau_c}{1+[\pi(f \pm f_b)\tau_c]^2}\left\{1-e^{-\frac{2\tau}{\tau_c}}\left[\cos 2\pi(f \pm f_b)\tau + \frac{\sin 2\pi(f \pm f_b)\tau}{\pi(f \pm f_b)\tau_c}\right]\right\} + e^{-\frac{2\tau}{\tau_c}}\delta(f \pm f_b) \quad (1)$$

where $\tau$ is a delay difference given by the interferometer, $\tau_c$ is a coherence time of a laser, and $\delta(f)$ is a delta function. $f_b$ is a frequency shift given by the optical frequency shifter in FIG. 1, and $f_b=0$ in the homodyne method and $f_b \neq 0$ in the heterodyne method. When the delay difference $\tau$ given by the interferometer is sufficiently long with respect to the coherence time $\tau_c$, ($\tau \gg \tau_c$), Formula (1) can be approximated as the following formula.

Formula 2

$$S(f) \propto \frac{1}{1+\left(\frac{f \pm f_b}{\sigma}\right)^2} \quad (2)$$

where $\sigma$ is a spectrum line width of a laser, and the fact that $\sigma=1/(\pi\tau_c)$ is established in a laser with a Lorentz-type oscillation spectrum is used. As illustrated in Formula (2), the power spectrum of the optical interference signal is a Lorentz function having a full width at half maximum of $2\sigma$ at $\tau \gg \tau_c$, and thus the spectrum line width $\sigma$ of the laser can be obtained using the half width at half maximum of the power spectrum.

CITATION LIST

Non Patent Literature

Non-Patent Literature 1: T. Okoshi et al., "Novel method for high resolution measurement of laser output spectrum," Electronics Letters, Vol. 16, No. 16, 1980, pp. 630-631

SUMMARY OF THE INVENTION

Technical Problem

As described above, in the self-delay heterodyne/homodyne method in the related art, it is necessary to provide the interferometer with a delay difference that is sufficiently long with respect to the coherence time of the laser, thereby there is a restriction that a laser that can be evaluated is limited to a laser that satisfies $\tau \gg \tau_c$. For example, to evaluate a laser having a line width of 1 kHz or less, it is necessary to prepare a delay fiber sufficiently longer than several hundred km in length, which is not always easy.

The present disclosure has been made in view of the above circumstances, and an object of the present disclosure is to provide an optical spectrum line width calculation method, apparatus, and program capable of calculating a spectrum line width of a laser to be measured from an optical interference signal generated by the optical interferometer having a delay line, based on a phase of the optical interference signal having a delay time longer than a delay time due to the delay line.

Means for Solving the Problem

To solve the above problem, an aspect of the present disclosure provides an optical spectrum line width calculation method for calculating an optical spectrum line width of a laser to be measured from an optical interference signal obtained by splitting light emitted from the laser to be measured into two light beams, and giving a delay time difference $\tau$ between the two split light beams to multiplex the two split light beams, the optical spectrum line width calculation method includes calculating a phase $X_1(t)$ of the optical interference signal, calculating a phase $X_N(t)$ (N is an integer of 2 or more) from the phase $X_1(t)$ by using the following equation, Formula 3

$$X_N(t) = -\sum_{n=0}^{N-1} X_1(t - n\tau)$$

calculating a power spectrum of a sine wave having the phase $X_N(t)$ as a phase, and calculating a spectrum line width of the laser to be measured using a half width at half maximum of the power spectrum.

Another aspect of the present disclosure provides an optical spectrum line width calculation method for calculating an optical spectrum line width of a laser to be measured from an optical interference signal obtained by splitting light emitted from the laser to be measured into two light beams, and giving a delay time difference $\tau$ and an optical frequency difference $f_b$ between the two split light beams to multiplex the two split light beams, the optical spectrum line width calculation method includes calculating a phase $X_1(t)$ of the optical interference signal, calculating a phase $X_N(t)$ (N is an integer of 2 or more) from the phase $X_1(t)$ by using the following equation, Formula 4

$$X_N(t) = \sum_{n=0}^{N-1} X_1(t - n\tau) - 2\pi(N - 1)f_b t$$

calculating a power spectrum of a sine wave having the phase $X_N(t)$ as a phase, and calculating a spectrum line width of the laser to be measured using a half width at half maximum of the power spectrum.

Yet another aspect of the present disclosure provides an optical spectrum line width calculation method for calculating an optical spectrum line width of a laser to be measured from an optical interference signal obtained by frequency-sweeping a frequency of light emitted from the laser to be measured at a sweep rate $\gamma$ and splitting the frequency-swept light into two light beams, and giving a delay time difference $\tau$ between the two split light beams to multiplex the two split light beams, the optical spectrum line width calculation method includes calculating a phase $X_1(t)$ of the optical interference signal, calculating a phase $X_N(t)$ (N is an integer of 2 or more) from the phase $X_1(t)$ by using the following equation, Formula 5

$$X_N(t) = \sum_{n=0}^{N-1} X_1(t - n\tau) - 2\pi(N - 1)\gamma\tau t$$

calculating a power spectrum of a sine wave having the phase $X_N(t)$ as a phase, and calculating a spectrum line width of the laser to be measured using a half width at half maximum of the power spectrum.

In the present disclosure, the calculating of the phase $X_N(t)$ and the calculating of the power spectrum are repeatedly performed while increasing N until the power spectrum converges to a Lorentz function, and the calculating of the spectrum line width of the laser to be measured sets the half width at half maximum of the power spectrum converged to the Lorentz function as the spectrum line width of the laser to be measured.

Yet another aspect of the present disclosure provides an optical spectrum line width calculation apparatus for calculating an optical spectrum line width of a laser to be measured from an optical interference signal obtained by splitting light emitted from the laser to be measured into two light beams, and giving a delay time difference $\tau$ between the two split light beams to multiplex the two split light beams, the optical spectrum line width calculation apparatus includes a first phase calculation unit configured to calculate a phase $X_1(t)$ of the optical interference signal, a second phase calculation unit configured to calculate a phase $X_N(t)$ (N is an integer of 2 or more) from the phase $X_1(t)$ by using the following equation, Formula 6

$$X_N(t) = \sum_{n=0}^{N-1} X_1(t - n\tau)$$

a power spectrum calculation unit configured to calculate a power spectrum of a sine wave having the phase $X_N(t)$ as a phase, and a spectrum line width calculation unit configured to calculate a spectrum line width of the laser to be measured using a half width at half maximum of the power spectrum.

Yet another aspect of the present disclosure provides an optical spectrum line width calculation apparatus for calculating an optical spectrum line width of a laser to be measured from an optical interference signal obtained by splitting light emitted from the laser to be measured into two light beams, and giving a delay time difference $\tau$ and an optical frequency difference $f_b$ between the two split light beams to multiplex the two split light beams, the optical spectrum line width calculation apparatus includes a first phase calculation unit configured to calculate a phase $X_1(t)$ of the optical interference signal, a second phase calculation unit configured to calculate a phase $X_N(t)$ (N is an integer of 2 or more) from the phase $X_1(t)$ by using the following equation, Formula 7

$$X_N(t) = \sum_{n=0}^{N-1} X_1(t - n\tau) - 2\pi(N - 1)f_b t$$

a power spectrum calculation unit configured to calculate a power spectrum of a sine wave having the phase $X_N(t)$ as a phase, and a spectrum line width calculation unit configured to calculate a spectrum line width of the laser to be measured using a half width at half maximum of the power spectrum.

Yet another aspect of the present disclosure provides an optical spectrum line width calculation apparatus for calculating an optical spectrum line width of a laser to be measured from an optical interference signal obtained by frequency-sweeping a frequency of light emitted from the laser to be measured at a sweep rate $\gamma$, splitting the frequency-swept light into two light beams, and giving a delay time difference $\tau$ between the two split light beams to multiplex the two split light beams, the optical spectrum line width calculation apparatus includes a first phase calculation unit configured to calculate a phase $X_1(t)$ of the optical interference signal, a second phase calculation unit configured to calculate a phase $X_N(t)$ (N is an integer of 2 or more) from the phase $X_1(t)$ by using the following equation, Formula 8

$$X_N(t) = \sum_{n=0}^{N-1} X_1(t - n\tau) - 2\pi(N-1)\gamma rt$$

a power spectrum calculation unit configured to calculate a power spectrum of a sine wave having the phase $X_N(t)$ as a phase, and a spectrum line width calculation unit configured to calculate a spectrum line width of the laser to be measured using a half width at half maximum of the power spectrum.

In the present disclosure, a comparison calculation unit is further provided, configured to cause the second phase calculation unit to calculate the phase $X_N(t)$ by increasing N until the power spectrum converges to a Lorentz function, and input the power spectrum to the spectrum line width calculation unit when the power spectrum converges to the Lorentz function.

Yet another aspect of the present disclosure provides a program for causing a processor to function as each of the calculation units of the optical spectrum line width calculation apparatus.

Effects of the Invention

By using the present disclosure, a line width can be measured even under the condition of $\tau < \tau_c$, so that a line width measurement with higher resolution than before can be realized. In addition, in the related art, it is necessary to extend a delay fiber of an interferometer in order to improve the line width resolution. However, the present disclosure is implemented only by the signal processing for the optical interference signal, so that the resolution can be improved without changing an apparatus configuration. Thereby, it is possible to increase the resolution of the existing line width measuring device using the self-delay heterodyne/homodyne method only by incorporating the algorithm of the present disclosure into the signal processing unit.

DESCRIPTION OF EMBODIMENTS

Hereinafter, embodiments of the present disclosure will be described in detail.

To achieve the above object, in the present disclosure, a phase function corresponding to an optical interference signal when a delay amount given by an interferometer is increased by an integer multiple is derived by a numerical calculation from the optical interference signal obtained in a self-delay heterodyne/homodyne method, and a spectrum line width of a laser to be measured is obtained using the half width at half maximum of a power spectrum of a sine wave signal having the derived phase function as a phase.

The optical interference signal I(t) obtained by using the self-delay heterodyne/homodyne method can be described as the following formula.

Formula 9

$$I(t) = P_0 \cos[2\pi f_b t + \theta(t) - \theta(t-\tau)] \quad (3)$$

where $P_0$ is an optical intensity, and $\theta(t)$ is phase noise. The phase component $X_1(t)$ of I(t) is obtained by the following formula.

Formula 10

$$\begin{aligned} X_1(t) &= \tan^{-1} \frac{H[I(t)]}{I(t)} \\ &= \tan^{-1} \frac{P_0 \sin[2\pi f_b t + \theta(t) - \theta(t-\tau)]}{P_0 \cos[2\pi f_b t + \theta(t) - \theta(t-\tau)]} \\ &= 2\pi f_b t + \theta(t) - \theta(t-\tau) \end{aligned} \quad (4)$$

where H[I(t)] is a Hilbert transform of I(t). Note that the optical interference signal in which a phase is delayed by $\pi/2$ is calculated by the Hilbert transform, but may be obtained by using a 90-degree optical hybrid circuit instead. By calculating the following formula using $X_1(t)$, a phase $X_N(t)$ of the optical interference signal when the delay difference $\tau$ of the interferometer is increased N times (N is a natural number) can be calculated.

Formula 11

$$\begin{aligned} X_N(t) &= \sum_{n=0}^{N-1} X_1(t - n\tau) - 2\pi(N-1) f_b t \\ &= 2\pi f_b t + \theta(t) - \theta(t - N\tau) - N(N-1)\pi f_b \tau \end{aligned} \quad (5)$$

Figure 1:
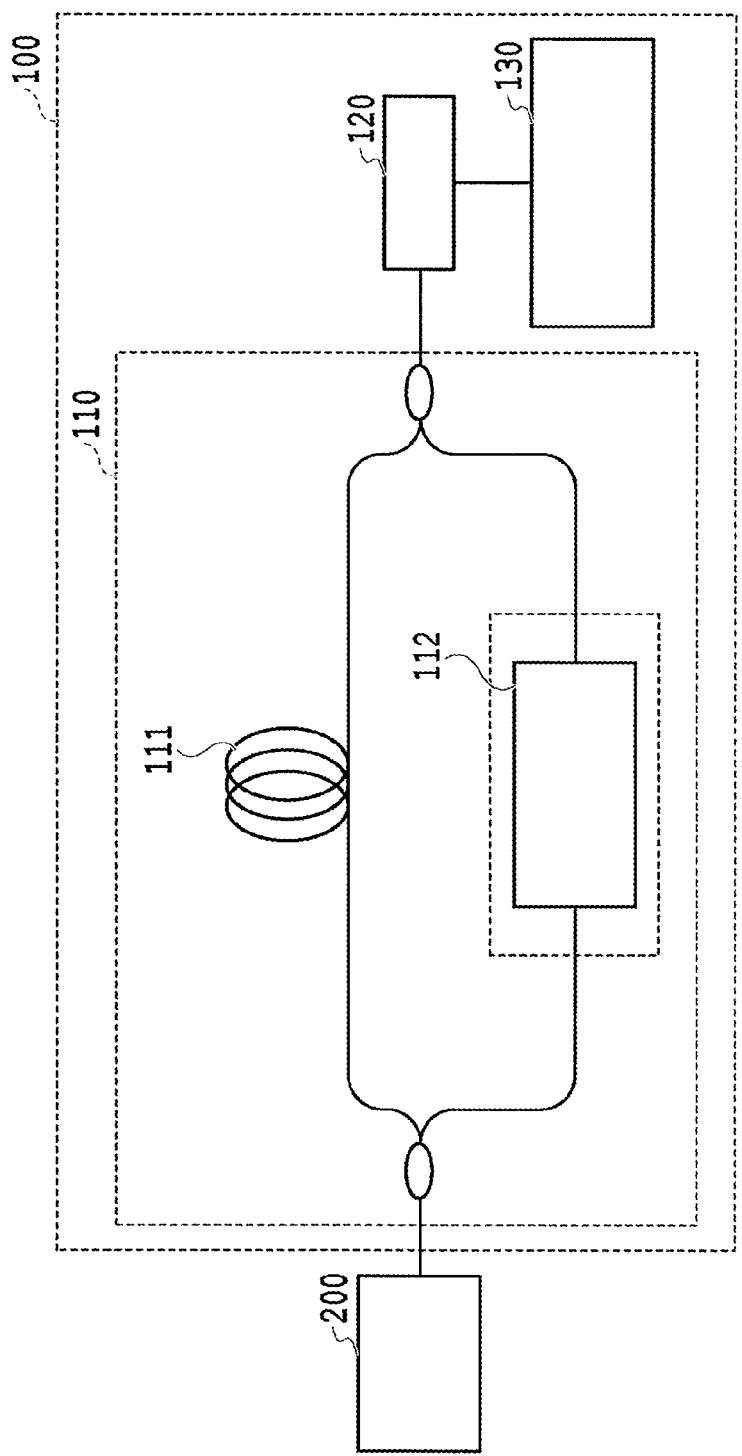
FIG. 1 is a diagram illustrating a configuration example of a general optical spectrum line width measurement apparatus using a self-delay heterodyne/homodyne method.
Figure 2:
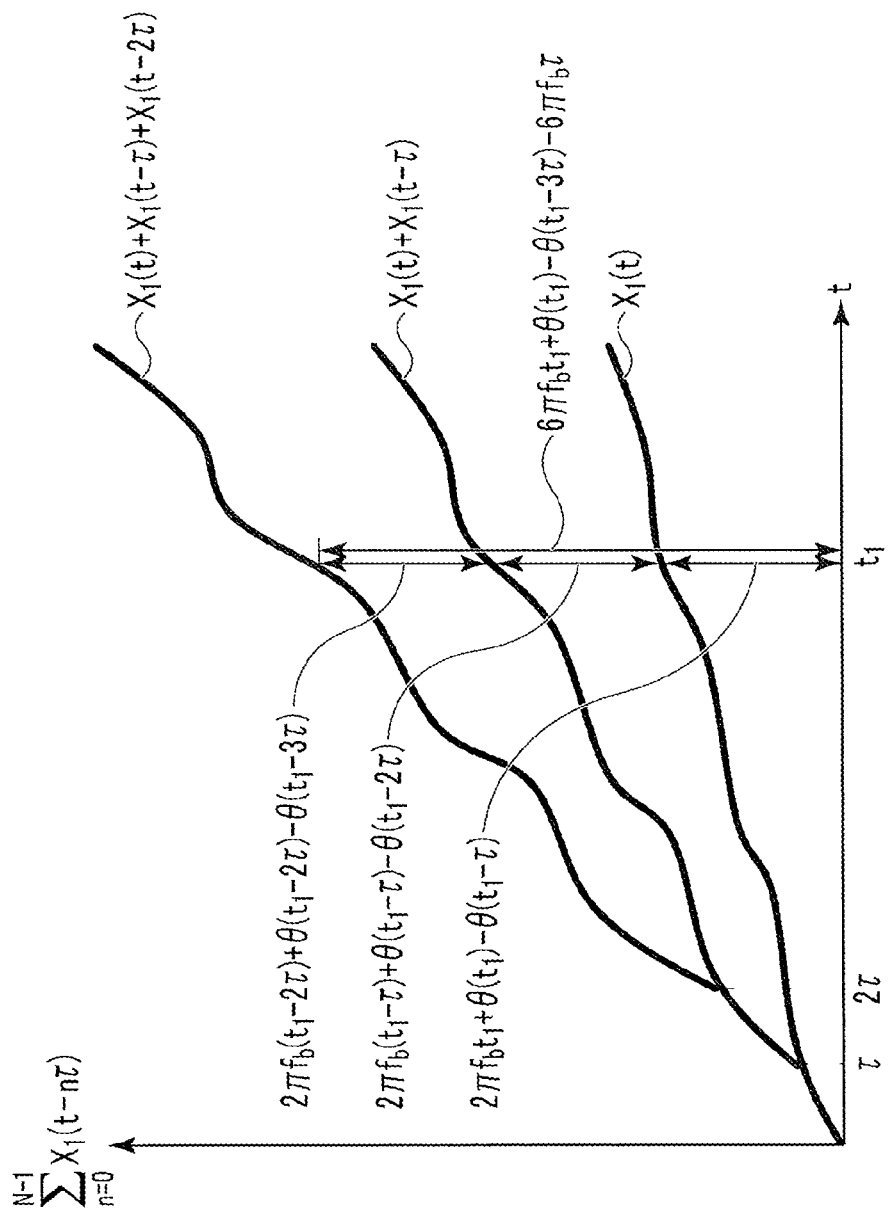
FIG. 2 is an image diagram visually illustrating a calculation of Formula (5).

FIG. 2 is an image diagram visually illustrating a calculation of Formula (5). $\theta(t-\tau)$, $\theta(t-2\tau)$, ..., $\theta(t-(N-1)\tau)$ are mutually canceled between terms of adjacent delay difference $\tau$ by adding the phases $X_1(t-n\tau)$ in which delays are lengthened at intervals of $\tau$. As a result, only the phase noise term $\theta(t) - \theta(t - N\tau)$ remains. The half width at half maximum of the power spectrum is determined only by the term dependent on t. Thus, when the term $(N(N-1)\pi f_b \tau)$ that does not depend on t is ignored from the comparison between Formulas (4) and (5), in the phase $X_N(t)$ calculated by Formula (5), the phase obtained by the interferometer having the delay difference $N\tau$ is equal to the half width at half maximum of the power spectrum.

Figure 3:
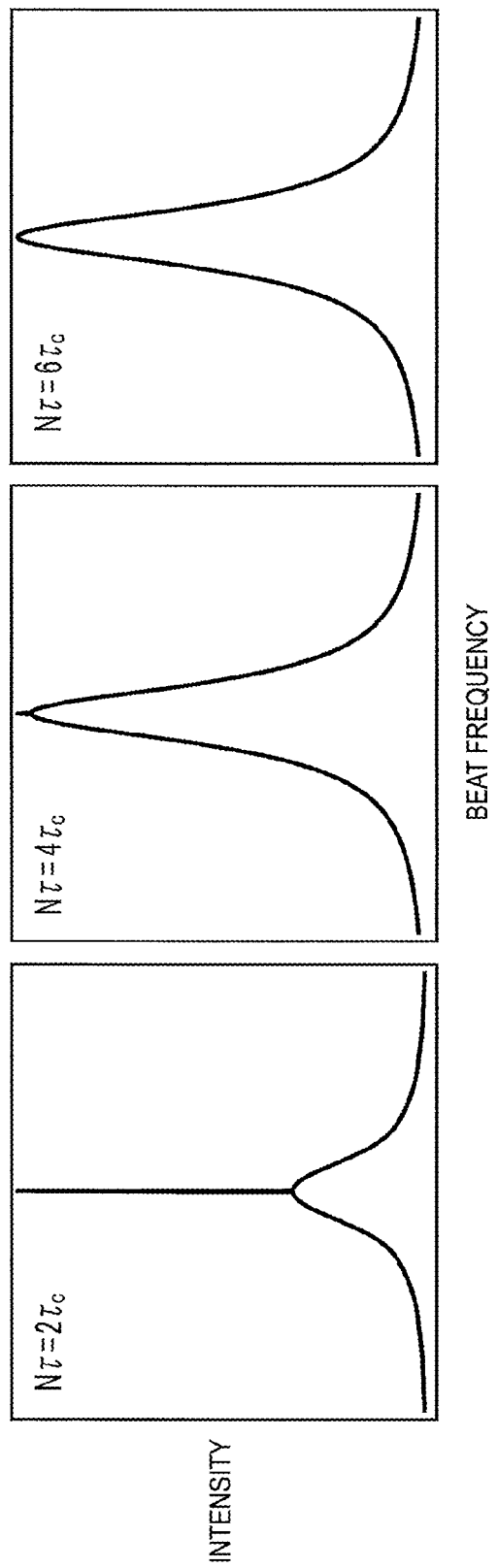
FIG. 3 is an image diagram illustrating a calculation result of a power spectrum $|F[\cos X_N(t)]|^2$ of $\cos X_N(t)$.

FIG. 3 is an image diagram illustrating a calculation result of a power spectrum $|F[\cos X_N(t)]|^2$ of $\cos X_N(t)$. Further, FIG. 4 is a diagram illustrating an example of N dependency of a half width at half maximum of a power spectrum. where $F[\cos X_N(t)]$ is a Fourier transform of $\cos X_N(t)$.

Figure 4:
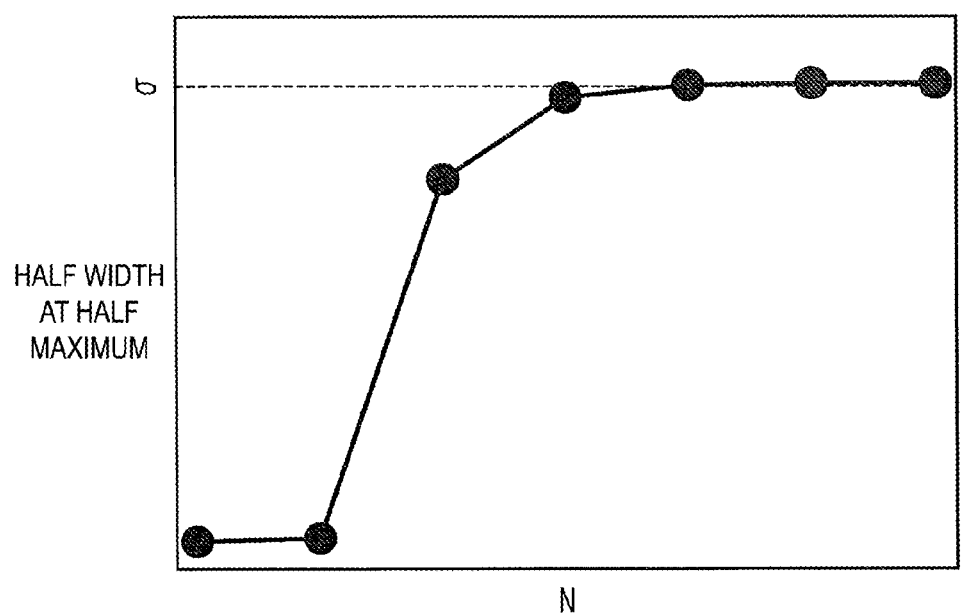
FIG. 4 is a diagram illustrating an example of N dependency of a half width at half maximum of a power spectrum.

As illustrated in FIG. 3 and FIG. 4, as N is increased, the power spectrum $|F[\cos X_N(t)]|^2$ converges to a Lorentz function having a spectrum line width σ of the laser as half width at half maximum. Thus, in the self-delay heterodyne/homodyne method, even when the delay difference τ provided by the Mach-Zehnder interferometer is in a condition of $\tau < \tau_c$, the power spectrum $|F[\cos X_N(t)]|^2$ of $\cos X_N(t)$ is calculated by using a sufficiently large value N that can be regarded as $N\tau \gg \tau_c$, the half width at half maximum of the power spectrum is obtained, and the spectrum line width σ of the laser can be obtained.

First Embodiment

Figure 5:
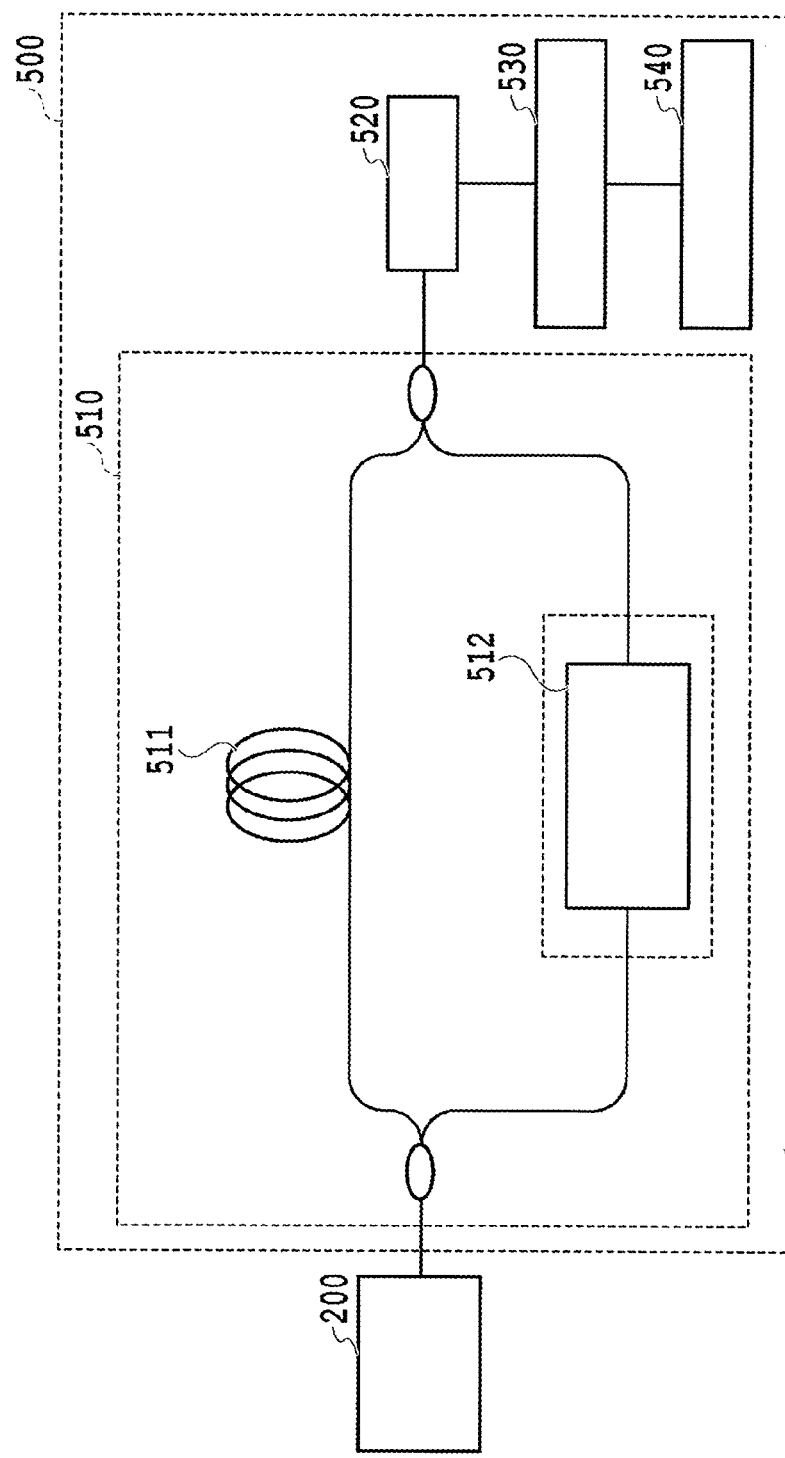
FIG. 5 is a diagram illustrating a configuration example of the optical spectrum line width measurement apparatus according to a first embodiment of the present disclosure.

FIG. 5 is a diagram illustrating a configuration example of the optical spectrum line width measurement apparatus according to a first embodiment of the present disclosure. The optical spectrum line width measurement apparatus 500 includes a Mach-Zehnder interferometer 510, an optical receiver 520 that receives an optical interference signal emitted from the Mach-Zehnder interferometer 510, an A/D converter 530 that converts an analog electric signal output from the optical receiver 520 into a digital electric signal, and an processing apparatus 540 that processes the digital electric signal.

In the Mach-Zehnder interferometer 510, an optical delay fiber 511 is provided on one arm waveguide, and an optical frequency shifter 512 is provided on the other arm waveguide. When the homodyne method is used, the optical frequency shifter 512 is omitted. As in the case of the known self-delay heterodyne/homodyne method, two light beams having a delay difference τ are generated from light emitted from a laser to be measured 200 using the Mach-Zehnder interferometer 510, and an optical interference signal is generated by multiplexing the two light beams.

The optical interference signal emitted from the Mach-Zehnder interferometer 510 is input to the processing apparatus 540 as a digital signal via the optical receiver 520 and the A/D converter 530, and is processed as described below.

Figure 6:
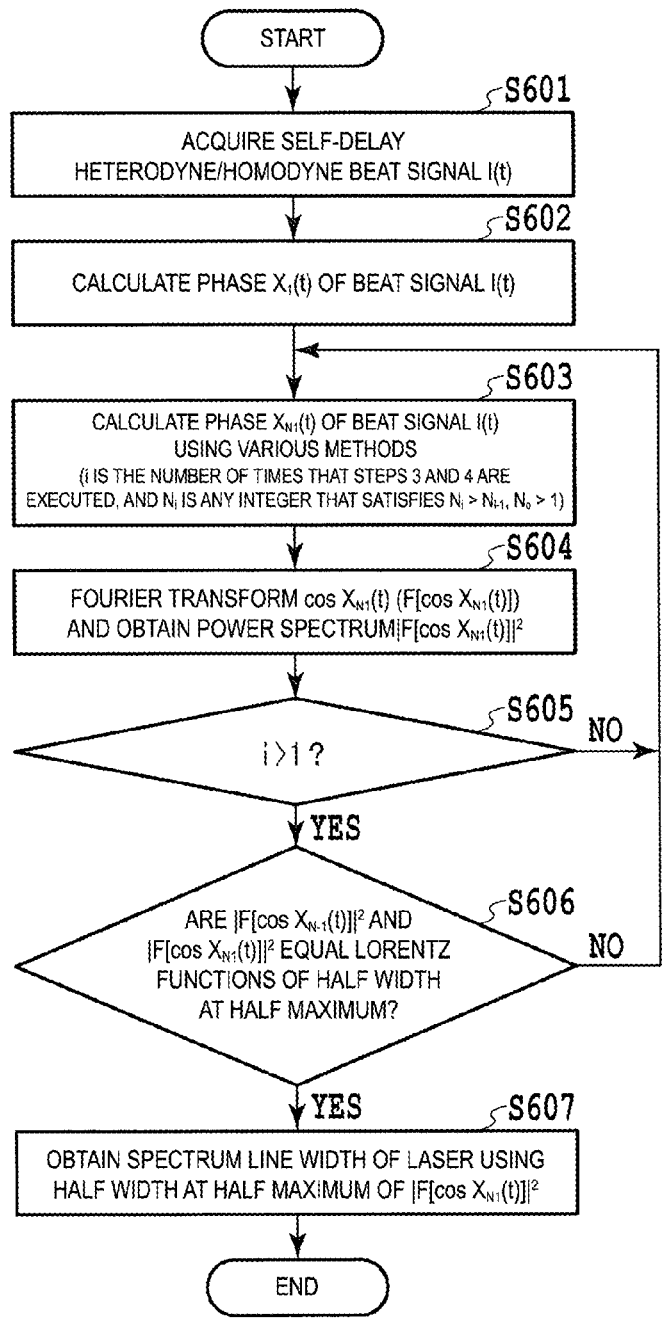
FIG. 6 is a flowchart illustrating a procedure of processing performed by an processing apparatus of the optical spectrum line width measurement apparatus of the present disclosure.

FIG. 6 is a flowchart illustrating a procedure of processing performed by an processing apparatus of the optical spectrum line width measurement apparatus of the present disclosure. First, the optical interference signal I(t) is acquired from the optical receiver 520 (S601), and the phase $X_1(t)$ is obtained by Formula (4) (S602). Next, a phase $X_N(t)$ corresponding to a phase when the delay difference τ given by the Mach-Zehnder interferometer 510 is increased by N times is obtained by a numerical calculation using $X_1(t)$ (S603). For the calculation of $X_N(t)$, Formula (6) is used in the case of the self-delay heterodyne method, and Formula (7) is used in the case of the self-delay homodyne method.

Formula 12

$$X_{Ni}(t) = \Sigma_{n=0}^{N_i-1} X_1(t-n\tau) = 2\pi(N_i-1)f_b t \qquad (6)$$

Formula 13

$$X_{Ni}(t) = \Sigma_{n=0}^{N_i-1} X_1(t-n\tau) \qquad (7)$$

where i indicates the number of times that step S603 and step S604 to be described later are executed, and regarding the $N_i$, $N_0$ is any integer 2 or more and the relationship is $N_i > N_{i-1}$. The sum phase $X_1(t)$ is calculated retroactively from the measured and recorded value. Next, a Fourier transform $F[\cos X_{N0}(t)]$ of $\cos X_{N0}(t)$ is calculated, and a power spectrum $|F[\cos X_{N0}(t)]|^2$ is obtained (S604). Next, a phase $X_{N1}(t)$ at an integer $N_1$ larger than $N_0$ is calculated to obtain a power spectrum $|F[\cos X_{N1}(t)]|^2$ (S605). At this time, when $N_0$ satisfies $N_0 \gg \tau_c/\tau$, both $|F[\cos X_{N0}(t)]|^2$ and $|F[\cos X_{N1}(t)]|^2$ become substantially the same Lorentz function having a laser line width σ as half width at half maximum.

On the other hand, when two power spectra $|F[\cos X_{N0}(t)]|^2$ and $|F[\cos X_{N0}(t)]|^2$ have mutually different spectrum shapes, this means that No does not satisfy $N_0 \gg \tau_c/\tau$ and a larger delay difference is required, thereby it is necessary to obtain a power spectrum $|F[\cos X_{Ni}(t)]|^2$ using $N_i$ larger than $N_0$.

In this case, the phase $X_N(t)$ and the power spectrum $|F[\cos X_N(t)]|^2$ are repeatedly calculated for $N=N_i$ and $N_{i+1}$ while increasing i to increase $N_i$, and until the difference between the power spectra $|F[\cos X_{Ni}(t)]|^2$ and $|F[\cos X_{Ni+1}(t)]|$ can be regarded as sufficiently small and thus the power spectra $|F[\cos X_{Ni}(t)]|^2$ and $|F[\cos X_{Ni+1}(t)]|^2$ are obtained, regarded as equal Lorentz functions (S606). When the shape change of $|F[\cos X_N(t)]|^2$ converges with the increase of N, the spectrum line width σ of the laser to be measured is obtained using the half width at half maximum of $|F[\cos X_N(t)]|^2$ (S607).

Figure 7:
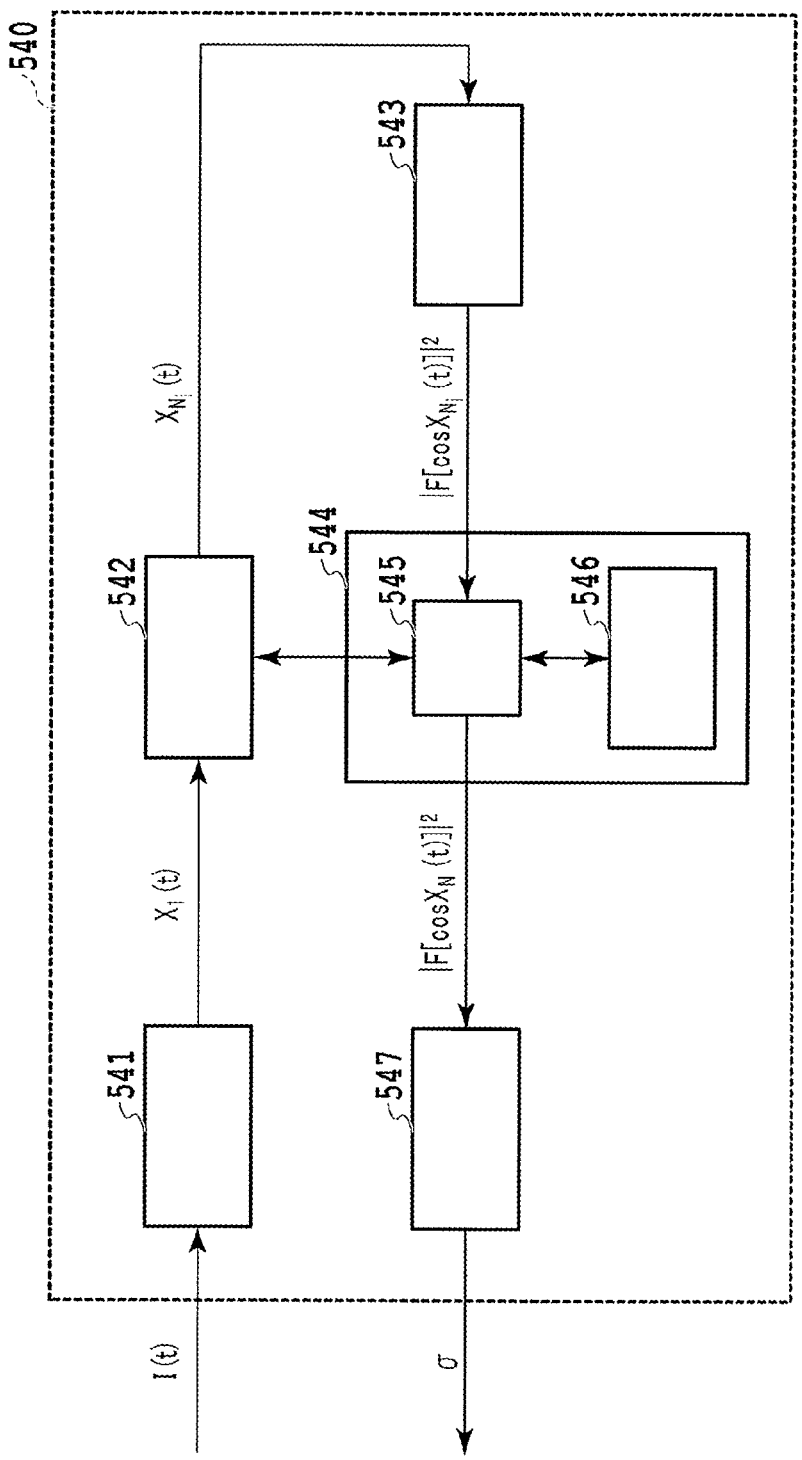
FIG. 7 is a functional configuration diagram of the processing apparatus of the optical spectrum line width measurement apparatus of the present disclosure.

FIG. 7 illustrates a functional configuration diagram of the processing apparatus of the optical spectrum line width measurement apparatus of the present disclosure. As described in the flowchart in FIG. 6, when the optical interference signal I(t) is input to the processing apparatus 540, a phase $X_1(t)$ is calculated from the optical interference signal I(t) in the first phase calculation unit 541. Next, in the second phase calculation unit 542, the phase $X_{Ni}(t)$ is calculated with any integer $N_i$ of 2 or more based on the phase $X_1(t)$. When the phase $X_{Ni}(t)$ is calculated, the power spectrum calculation unit 543 calculates the power spectrum $|F[\cos X_{Ni}(t)]|^2$ of the sine wave of the phase $X_{Ni}(t)$. The comparison calculation unit 544 includes a comparison determination unit 545 and a storage unit 546. The comparison determination unit 545 stores the input power spectrum $|F[\cos X_{Ni}(t)]|^2$ in the storage unit 546, and compares the power spectra $|F[\cos X_{Ni}(t)]|^2$ and $|F[\cos X_{Ni+1}(t)]|^2$ to determine whether the spectra can be regarded as the same Lorentz function on a predetermined criteria. When the spectra can be considered to be identical, the comparison determination unit 545 outputs the power spectrum $|F[\cos X_{Ni}(t)]|^2$, and when they cannot be considered to be identical, causes the second phase calculation unit 542 to calculate the phase $X_{Ni}(t)$ for a larger $N_i$. When power spectrum $|F[\cos X_{Ni}(t)]|^2$ is output from comparison determination unit 545, the spectrum line width calculation unit 547 calculates the spectrum line width σ of the laser to be measured from the half width at half maximum of the power spectrum $|F[\cos X_{Ni}(t)]|^2$.

As described above, obtaining the power spectrum of the optical interference signal with respect to the plurality of delay differences $N_i\tau$ by changing the magnification of the delay difference has an important meaning in improving the line width measurement accuracy. In the known self-delay heterodyne/homodyne method, it is necessary to give a delay difference τ sufficiently longer than the coherence time $\tau_c$ of the laser to the interferometer. However, the coherence time $\tau_c$ of the laser to be measured is unknown in many situations, and there is no way for checking whether the delay difference τ of the interferometer satisfies $\tau \gg \tau_c$. Thus, in the related art, $\tau \gg \tau_c$ cannot be guaranteed, and the measured line width value may not be sufficiently reliable, thereby in the specification of the narrow line width laser, "line width XX Hz or less" is described, and a specific line width value may not be described.

On the other hand, in the present disclosure, the power spectrum of the optical interference signal can be generated with respect to the delay difference $N_i\tau$ of any integer multiple of the delay difference $\tau$ of the interferometer, and thus it is possible to acquire the power spectrum shapes of the optical interference signals having a plurality of different delay differences, and to grasp the changing status of the power spectrum shapes. Thereby, by checking that the power spectrum of the optical interference signals of the plurality of delay differences $N_i\tau$ and $N_{i+1}\tau$ converge to the same Lorentz type, it is possible to determine whether $N_i\tau \gg \tau_c$ is satisfied. In the present disclosure, the spectrum line width of the laser is calculated using the half width at half maximum of the power spectrum $|F[\cos X_{Ni}(t)]|^2$ that securely satisfies $N_i\tau \gg \tau_c$, and thus a more accurate line width evaluation than before can be realized.

When the coherence time $\tau_c$ of the laser to be measured is known in advance, the magnification N that satisfies the condition of $N_\tau \gg \tau_c$ is also known in advance, and thus the steps S605 and S606 in the flowchart illustrated in FIG. 6 and the comparison calculation unit 544 in the functional configuration diagram of the processing apparatus illustrated in FIG. 7 can be omitted.

Second Embodiment

Figure 8:
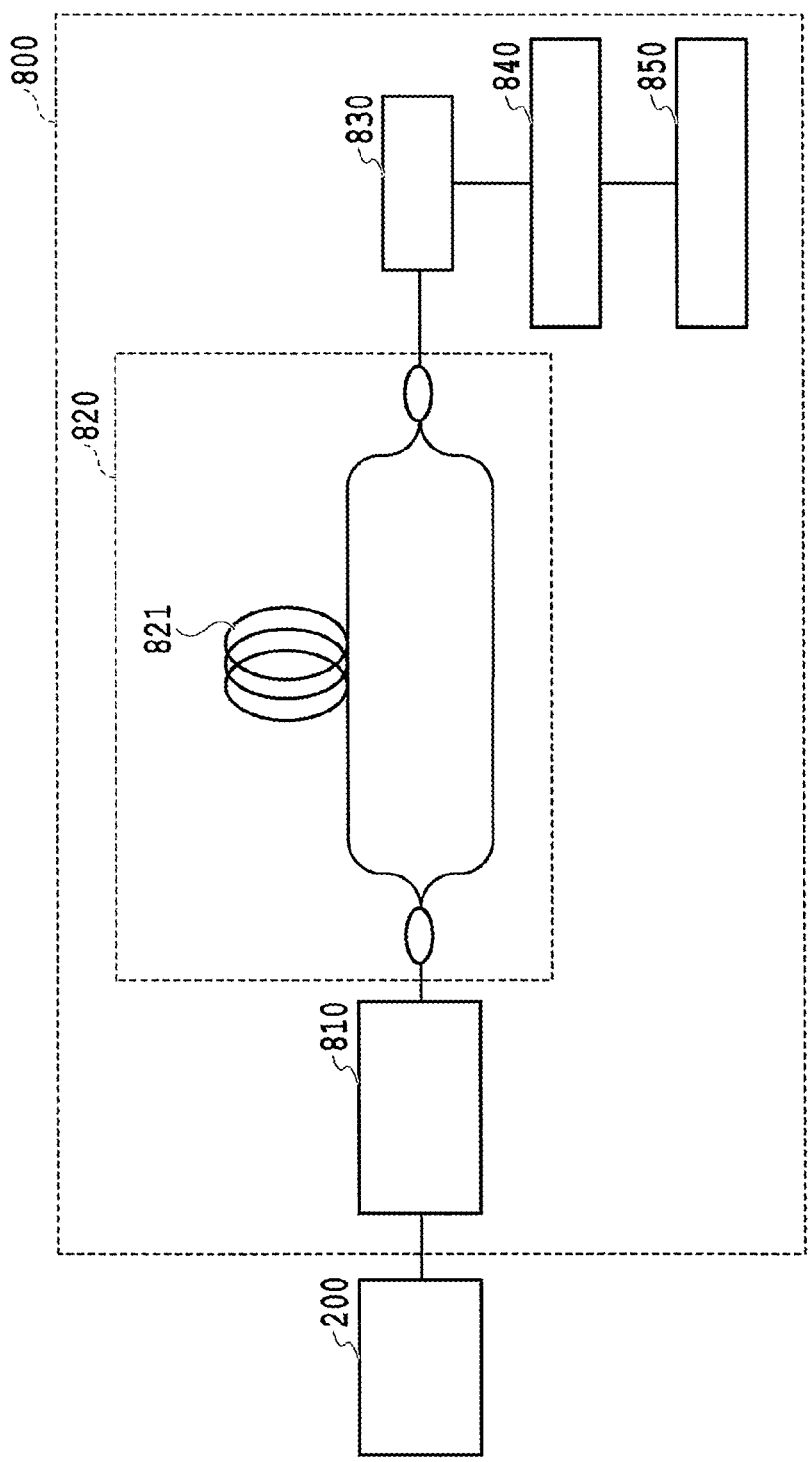
FIG. 8 is a diagram illustrating a configuration example of the optical spectrum line width measurement apparatus according to a second embodiment of the present disclosure.

FIG. 8 is a diagram illustrating a configuration example of the optical spectrum line width measurement apparatus according to a second embodiment of the present disclosure. The optical spectrum line width measurement apparatus 800 includes an optical frequency sweeper 810, a Mach-Zehnder interferometer 820 into which light where frequency is swept by the optical frequency sweeper 810 is incident, an optical receiver 830 that receives an optical interference signal emitted from the Mach-Zehnder interferometer 820, an A/D converter 840 that converts an analog electric signal output from the optical receiver 830 into a digital electric signal, and an processing apparatus 850 that processes the digital electric signal.

In the Mach-Zehnder interferometer 820, an optical delay fiber 821 is provided on one arm waveguide.

The light emitted from the laser to be measured 200 enters the optical frequency sweeper 810 and is frequency-swept at the frequency sweep rate $\gamma$. When the frequency-swept light is incident on the Mach-Zehnder interferometer 820, the light is split into two light beams and multiplexed with a delay time difference $\tau$, and an optical interference signal is emitted. The optical interference signal emitted from the Mach-Zehnder interferometer 820 is detected by the optical receiver 830, and the obtained optical interference signal I(t) can be described as the following formula.

Formula 14

$$I(t) \propto \cos[2\pi\gamma\tau t + \theta(t) - \theta(t-\tau)] \quad (8)$$

As is clear from the comparison between Formulas (3) and (8), the optical interference signal obtained in the present embodiment is equivalent to the optical interference signal obtained when $f_b = \gamma\tau$ with the self-delay heterodyne method. Thus, by assigning $f_b = \gamma\tau$ in Formula (6), the same processing as in the first embodiment can be applied to the present embodiment. That is, by calculating the following formula using the phase $X_1(t)$ of I(t), $X_N(t)$ obtained by increasing the delay difference given by the interferometer by N times can be obtained.

Formula 15

$$X_{N_i}(t) = \Sigma_{n=0}^{N_i-1} X_1(t-n\tau) - 2\pi(N_i-1)\gamma\tau t \quad (9)$$

The I(t) converted to a digital signal by the A/D converter 840 is transferred to the processing apparatus 850, and the processing apparatus 850 performs the processing illustrated in FIG. 6 in the same manner as in the first embodiment, thereby the spectrum line width $\sigma$ of the laser to be measured 200 is obtained. The functional configuration of the processing apparatus 850 can be the same configuration as that illustrated in FIG. 7.

The present embodiment is particularly useful for performance evaluation of a laser used for an optical frequency domain reflection measurement. In the optical frequency domain reflection measurement, not only the coherence of the laser but also the nonlinearity of the optical frequency sweep affects the measurement resolution. In the present embodiment, not only the phase noise of the laser but also the effect of the sweep nonlinearity affects the spectrum line width (the effect of the sweep nonlinearity is also included in $\theta(t)$ in Formula (8)), thereby it is desirable to use the present embodiment for the purpose of estimating the measurement performance of the optical frequency domain reflection measurement.

The processing apparatuses 540 and 850 of the first and second embodiments can also be realized by a computer and a program for causing the computer to execute the steps illustrated in FIG. 6. The program can be recorded on a recording medium and provided, or can be provided via a network.

REFERENCE SIGNS LIST 100, 500, 800 Optical spectrum line width measurement apparatus
110, 510, 820 Mach-Zehnder interferometer
111, 511, 821 Optical delay fiber
112, 512 Optical frequency shifter
120, 520, 830 Optical receiver
130 RF spectrum analyzer
200 Laser to be measured
530, 840 A/D converter
540, 850 Processing apparatus
541 First phase calculation unit
542 Second phase calculation unit
543 Power spectrum calculation unit
544 Comparison calculation unit
545 Comparison determination unit
546 Storage unit
547 Spectrum line width calculation unit
810 Optical frequency sweeper

The invention claimed is:
1. An optical spectrum line width calculation method for calculating an optical spectrum line width of a laser to be measured from an optical interference signal, the optical spectrum line width calculation method comprising:
obtaining the optical interference signal by splitting into two light beams by an optical interferometer light emitted from the laser to be measured, and giving a delay time difference $\tau$ between the two split light beams to multiplex the two split light beams;
calculating a phase $X_1(t)$ of the optical interference signal;

calculating a phase $X_N(t)$ (N is an integer of 2 or more) from the phase $X_1(t)$ by using the following equation;

$$X_N(t) = \sum_{n=0}^{N-1} X_1(t - n\tau)$$

calculating a power spectrum of a sine wave having the phase $X_N(t)$ as a phase; and calculating a spectrum line width of the laser to be measured using a half width at half maximum of the power spectrum.

2. The optical spectrum line width calculation method according to claim 1, wherein the calculating of the phase $X_N(t)$ and the calculating of the power spectrum are repeatedly performed while increasing N until the power spectrum converges to a Lorentz function, and the calculating of the spectrum line width of the laser to be measured sets the half width at half maximum of the power spectrum converged to the Lorentz function as the spectrum line width of the laser to be measured.

3. An optical spectrum line width calculation method for calculating an optical spectrum line width of a laser to be measured from an optical interference signal, the optical spectrum line width calculation method comprising:

obtaining the optical interference signal by splitting into two light beams by an optical interferometer light emitted from the laser to be measured, and giving a delay time difference $\tau$ and an optical frequency difference $f_b$ between the two split light beams to multiplex the two split light beams;

calculating a phase $X_1(t)$ of the optical interference signal;

calculating a phase $X_N(t)$ (N is an integer of 2 or more) from the phase $X_1(t)$ by using the following equation;

$$X_N(t) = \sum_{n=0}^{N-1} X_1(t - n\tau) - 2\pi(N-1)f_b t$$

calculating a power spectrum of a sine wave having the phase $X_N(t)$ as a phase; and calculating a spectrum line width of the laser to be measured using a half width at half maximum of the power spectrum.

4. The optical spectrum line width calculation method according to claim 3, wherein the calculating of the phase $X_N(t)$ and the calculating of the power spectrum are repeatedly performed while increasing N until the power spectrum converges to a Lorentz function, and the calculating of the spectrum line width of the laser to be measured sets the half width at half maximum of the power spectrum converged to the Lorentz function as the spectrum line width of the laser to be measured.

5. An optical spectrum line width calculation method for calculating an optical spectrum line width of a laser to be measured from an optical interference signal, the optical spectrum line width calculation method comprising:

obtaining the optical interference signal by frequency-sweeping a frequency of light emitted from the laser to be measured at a sweep rate $\gamma$, splitting by an optical interferometer the frequency-swept light into two light beams, and giving a delay time difference $\tau$ between the two split light beams to multiplex the two split light beams;

calculating a phase $X_1(t)$ of the optical interference signal;

calculating a phase $X_N(t)$ (N is an integer of 2 or more) from the phase $X_1(t)$ by using the following equation;

$$X_N(t) = \sum_{n=0}^{N-1} X_1(t - n\tau) - 2\pi(N-1)\gamma\tau t$$

calculating a power spectrum of a sine wave having the phase $X_N(t)$ as a phase; and calculating a spectrum line width of the laser to be measured using a half width at half maximum of the power spectrum.

6. The optical spectrum line width calculation method according to claim 5, wherein the calculating of the phase $X_N(t)$ and the calculating of the power spectrum are repeatedly performed while increasing N until the power spectrum converges to a Lorentz function, and the calculating of the spectrum line width of the laser to be measured sets the half width at half maximum of the power spectrum converged to the Lorentz function as the spectrum line width of the laser to be measured.

7. An optical spectrum line width calculation apparatus for calculating an optical spectrum line width of a laser to be measured from an optical interference signal, the optical spectrum line width calculation apparatus comprising:

an optical interferometer configured to obtain the optical interference signal by splitting into two light beams light emitted from the laser to be measured, and giving a delay time difference $\tau$ between the two split light beams to multiplex the two split light beams;

a first phase calculation unit configured to calculate a phase $X_1(t)$ of the optical interference signal;

a second phase calculation unit configured to calculate a phase $X_N(t)$ (N is an integer of 2 or more) from the phase $X_1(t)$ by using the following equation;

$$X_N(t) = \sum_{n=0}^{N-1} X_1(t - n\tau)$$

a power spectrum calculation unit configured to calculate a power spectrum of a sine wave having the phase $X_N(t)$ as a phase; and a spectrum line width calculation unit configured to calculate a spectrum line width of the laser to be measured using a half width at half maximum of the power spectrum.

8. The optical spectrum line width calculation apparatus according to claim 7, further comprising:

a comparison calculation unit configured to cause the second phase calculation unit to calculate the phase $X_N(t)$ by increasing N until the power spectrum converges to a Lorentz function, and input the power spectrum to the spectrum line width calculation unit when the power spectrum converges to the Lorentz function.

9. A computer readable hardware storage device having stored thereon executable code that, when executed, causes a processor to function as each of the calculation units of the optical spectrum line width calculation apparatus according to claim 8.

10. A computer readable hardware storage device having stored thereon executable code that, when executed, causes a processor to function as each of the calculation units of the optical spectrum line width calculation apparatus according to claim 7.

11. An optical spectrum line width calculation apparatus for calculating an optical spectrum line width of a laser to be measured from an optical interference signal, the optical spectrum line width calculation apparatus comprising:
   an optical interferometer configured to obtain by splitting into two light beams light emitted from the laser to be measured, and giving a delay time difference $\tau$ and an optical frequency difference $f_b$ between the two split light beams to multiplex the two split light beams;
   a first phase calculation unit configured to calculate a phase $X_1(t)$ of the optical interference signal;
   a second phase calculation unit configured to calculate a phase $X_N(t)$ (N is an integer of 2 or more) from the phase $X_1(t)$ by using the following equation;

$$X_N(t) = \sum_{n=0}^{N-1} X_1(t - n\tau) - 2\pi(N-1)f_b t$$

a power spectrum calculation unit configured to calculate a power spectrum of a sine wave having the phase $X_N(t)$ as a phase; and
   a spectrum line width calculation unit configured to calculate a spectrum line width of the laser to be measured using a half width at half maximum of the power spectrum.

12. The optical spectrum line width calculation apparatus according to claim 11, further comprising:
   a comparison calculation unit configured to cause the second phase calculation unit to calculate the phase $X_N(t)$ by increasing N until the power spectrum converges to a Lorentz function, and input the power spectrum to the spectrum line width calculation unit when the power spectrum converges to the Lorentz function.

13. A computer readable hardware storage device having stored thereon executable code that, when executed, causes a processor to function as each of the calculation units of the optical spectrum line width calculation apparatus according to claim 11.

14. An optical spectrum line width calculation apparatus for calculating an optical spectrum line width of a laser to be measured from an optical interference signal, the optical spectrum line width calculation apparatus comprising:
   an optical frequency sweeper configured to frequency-sweep a frequency of light emitted from the laser to be measured at a sweep rate $\gamma$;
   an optical interferometer configured to obtain the optical interference signal by splitting the frequency-swept light into two light beams, and giving a delay time difference $\tau$ between the two split light beams to multiplex the two split light beams;
   a first phase calculation unit configured to calculate a phase X1(t) of the optical interference signal;
   a second phase calculation unit configured to calculate a phase $X_N(t)$ (N is an integer of 2 or more) from the phase $X_1(t)$ by using the following equation;

$$X_N(t) = \sum_{n=0}^{N-1} X_1(t - n\tau) - 2\pi(N-1)\gamma\tau t$$

a power spectrum calculation unit configured to calculate a power spectrum of a sine wave having the phase $X_N(t)$ as a phase; and
   a spectrum line width calculation unit configured to calculate a spectrum line width of the laser to be measured using a half width at half maximum of the power spectrum.

15. The optical spectrum line width calculation apparatus according to claim 14, further comprising:
   a comparison calculation unit configured to cause the second phase calculation unit to calculate the phase $X_N(t)$ by increasing N until the power spectrum converges to a Lorentz function, and input the power spectrum to the spectrum line width calculation unit when the power spectrum converges to the Lorentz function.

16. A computer readable hardware storage device having stored thereon executable code that, when executed, causes a processor to function as each of the calculation units of the optical spectrum line width calculation apparatus according to claim 14.

* * * * *